US006402973B1

(12) United States Patent
Maeda et al.

(10) Patent No.: US 6,402,973 B1
(45) Date of Patent: Jun. 11, 2002

(54) PREPARATION OF SILICON SUBSTRATE

(75) Inventors: Yasushi Maeda; Masaharu Horiguchi, both of Naka-gun; Shinji Makikawa; Seiki Ejima, both of Annaka, all of (JP)

(73) Assignees: NTT Electronics Corp.; Shin-Etsu Chemical Co., Ltd., both of Tokyo (JP)

( * ) Notice: Subject to any disclaimer, the term of this patent is extended or adjusted under 35 U.S.C. 154(b) by 110 days.

(21) Appl. No.: 09/627,073

(22) Filed: Jul. 27, 2000

(30) Foreign Application Priority Data

Jul. 28, 1999 (JP) .......................................... 11-213443

(51) Int. Cl.[7] .................... H01L 21/306; H01L 21/304; C23F 1/00

(52) U.S. Cl. ............................ 216/39; 216/24; 216/38; 216/99

(58) Field of Search ............................ 216/24, 38, 39, 216/99

(56) References Cited

U.S. PATENT DOCUMENTS 5,629,532 A 5/1997 Myrick ........................ 257/77
5,903,697 A 5/1999 Yanagisawa et al. ....... 385/129
6,171,966 B1 * 1/2001 Deacon et al. ................ 117/95
6,264,851 B1 * 7/2001 Markovich et al. ......... 216/100

FOREIGN PATENT DOCUMENTS

DE 19636956 3/1998

OTHER PUBLICATIONS

Wolf, (Silicon Processing for The VLSI ERA), vol. 2 (Process Integration, 1990, pp. 45–46).*

Benaissa K. et al: "IC Compatible Optical Coupling Techniques for Integration of Arrow with Photodetector" *Journal of Lightwave Technology*, US, IEEE, NY, vol. 16, No. 8, Aug. 1, 1998 pp. 1423–1432.

JP 52–154360 English abstract, Dec. 22, 1977.

JP 63–131104 English abstract, Jun. 3, 1988.

Verbeek et al. Journal of Lightwave Technology, vol. 6, No. 6 Jun. 1988.

Katz et al. J. Electrochem. Soc.: Solid State Science and Technology, Oct. 1979.

Adar et al. Journal of Lightwave Technology, vol. 11, No. 2, Feb. 1993.

* cited by examiner

*Primary Examiner*—Frankie L. Stinson
*Assistant Examiner*—Shamim Ahmed
(74) *Attorney, Agent, or Firm*—Millen, White, Zelano & Branigan, P.C.

(57) ABSTRACT

A silicon substrate is prepared by furnishing a silicon substrate (10) having a step (11) of at least 5 μm high on one surface, forming by high pressure heat oxidation an oxide film (12) which is thinner than the step, and removing the oxide film on the higher surface region until the silicon surface is exposed in the higher surface region while leaving the oxide film on the lower surface region. Because of excellent electrical properties, minimized warpage, a substantially constant oxygen concentration, and a definitely ascertainable oxide-silicon boundary, the silicon substrate is suitable for use in optical waveguide devices.

1 Claim, 3 Drawing Sheets

1-1 10
11
1-2 10'
11
1-3 12 10' 12
1-4 12 10' 12

1
2-1
2
1'
2-2
3
2-3
1'
3
2-3'
1'
3
2-4
1'
4
3
2-4'
1'

PREPARATION OF SILICON SUBSTRATE

This invention relates to a method for preparing a silicon substrate with a transparent quartz film on its surface having improved electrical insulation and thus suited for use in optical waveguide devices for optical communication.

BACKGROUND OF THE INVENTION

Quartz substrates and silicon substrates are common substrates for use in optical waveguide devices for optical communication. The silicon substrates are typically used in the manufacture of semiconductor integrated circuits and characterized by a good heat conductivity and surface amenability to a variety of processes including etching, oxidation and deposition. They are available in large size and at a low cost.

In order to utilize quartz substrates and silicon substrates as the waveguide device substrate, a quartz glass thin film must be formed on the quartz or silicon substrate. Processes for forming such a thin film include CVD, evaporation, flame deposition, sol-gel, and high pressure oxidation processes.

More particularly, a first quartz film, known as an under clad, is formed on a quartz or silicon substrate to a thickness of about 10 to 20 μm. On the under clad, a second quartz film having a higher refractive index is deposited to a thickness of about 5 to 10 μm. This second quartz film is designated a core. A pattern through which light enters the core is formed as by etching. Finally, a third quartz film having a lower refractive index than the core is deposited thereon. The third film is designated an over clad. The stack of these three quartz films constructs an optical waveguide for an optical branching or switching device, that is, a quartz base optical waveguide.

Currently, terrace or platform substrates are often used. These substrates are prepared by applying an alkali such as a potassium hydroxide aqueous solution to a silicon substrate for anisotropic etching to form a step of at least 5 μm on the substrate surface. An oxide film having a greater thickness than the step is formed on the substrate surface by a CVD or flame deposition technique. The oxide film is polished away until the silicon surface is exposed.

This method is described in JP-A 63-131104. Referring to FIG. 2, a series of steps are illustrated. First, as shown in FIGS. 2-1 and 2-2, a silicon substrate 1 is wet etched to form a step 2, yielding a silicon substrate 1' having a stepped or recessed surface consisting of higher and lower surface regions. On the stepped surface (one side), a quartz film 3 (buffer layer) is formed as shown in FIG. 2-3, by a flame deposition technique. Then, the entire quartz film 3 is polished away until the silicon on the higher surface region is exposed as shown in FIG. 2-4.

This method suffers from several problem. On one side of the silicon substrate 1' having a stepped surface resulting from anisotropic etching, the quartz film 3 is formed by the flame deposition technique which involves heat treatment above 1,000° C. Then, the substrate can warp outward of the quartz film side to a warpage of about 200 μm as shown in FIG. 2-3'. Such a large warpage cannot be fully offset simply by placing a weight on the substrate. During the step of polishing away the deposited film, a vacuum chuck must be used to correct the warpage. The warpage must be offset within the range of ±1 μm over the entire wafer, which requires a very cumbersome operation.

If a quartz film is directly formed on a recessed surface of a silicon substrate 1' as shown in FIG. 2-4', thermal stresses are applied near the corner of the recess due to differential thermal expansion between the substrate and the film during sintering. A potential remains for creating micro-cracks 4 near the corner.

In addition to the above-described problem associated with polishing, another problem arises from the flame deposition technique. Upon formation of a quartz film, it must be doped with boron oxide and phosphorus oxide. This, in turn, requires to control the concentration of dopants and the concentration distribution in plane and depth directions, which can otherwise adversely affect the electrical properties (insulation and dielectric constant) of the quartz film.

SUMMARY OF THE INVENTION

An object of the invention is to provide a method for preparing a silicon substrate having on its surface a quartz film with improved electrical insulation and free of micro-cracks, the substrate being suited for use in optical devices, typically optical waveguide devices.

According to the invention, a silicon substrate having a step of at least 5 μm high on one surface is furnished. The silicon substrate is subjected to high pressure heat oxidation to form thereon an oxide film which is thinner than the height of the step. Then the oxide film on the higher surface region is removed until the silicon surface is exposed in the higher surface region.

More particularly, a silicon substrate having a step on one surface, that is, higher and lower surface regions connected by a step on the same side is subjected to high pressure heat oxidation whereby the silicon substrate is provided with a terrace structure. Opposite surfaces of the silicon substrate are oxidized under a pressure higher than the atmospheric pressure whereupon a dense, pure oxide film (quartz film) is formed on each surface of the substrate. The oxide film provides improved electrical insulation. Since the oxide films are formed on opposite surfaces of the substrate, the substrate as oxidized is unlikely to warp, and the potential for creating micro-cracks in the oxide film is minimized. Since the oxide film is thinner than the step, the silicon layer can be exposed simply by polishing away the oxide film on the higher surface region. The polishing step takes only a short time. The silicon substrate produced by the method of the invention is a terrace substrate having improved electrical properties, high quality and minimized warpage, which is advantageously used as optical waveguide devices in optical integrated circuits.

The method of the invention is successful in briefly producing a silicon substrate having improved properties through simple steps.

DESCRIPTION OF THE PREFERRED EMBODIMENT

The method for preparing a silicon substrate according to the invention involves the steps of furnishing a silicon substrate having higher and lower surface regions connected by a step of at least 5 μm high on the same side, subjecting the silicon substrate to high pressure heat oxidation to form thereon an oxide film which is thinner than the height of the step, and removing the oxide film on the higher surface region by polishing or etching, thereby exposing the silicon surface in the higher surface region while leaving the oxide film on the lower surface region. The silicon substrate thus obtained is suitable for use in optical devices, typically optical waveguide devices for optical communication.

Figure 1:
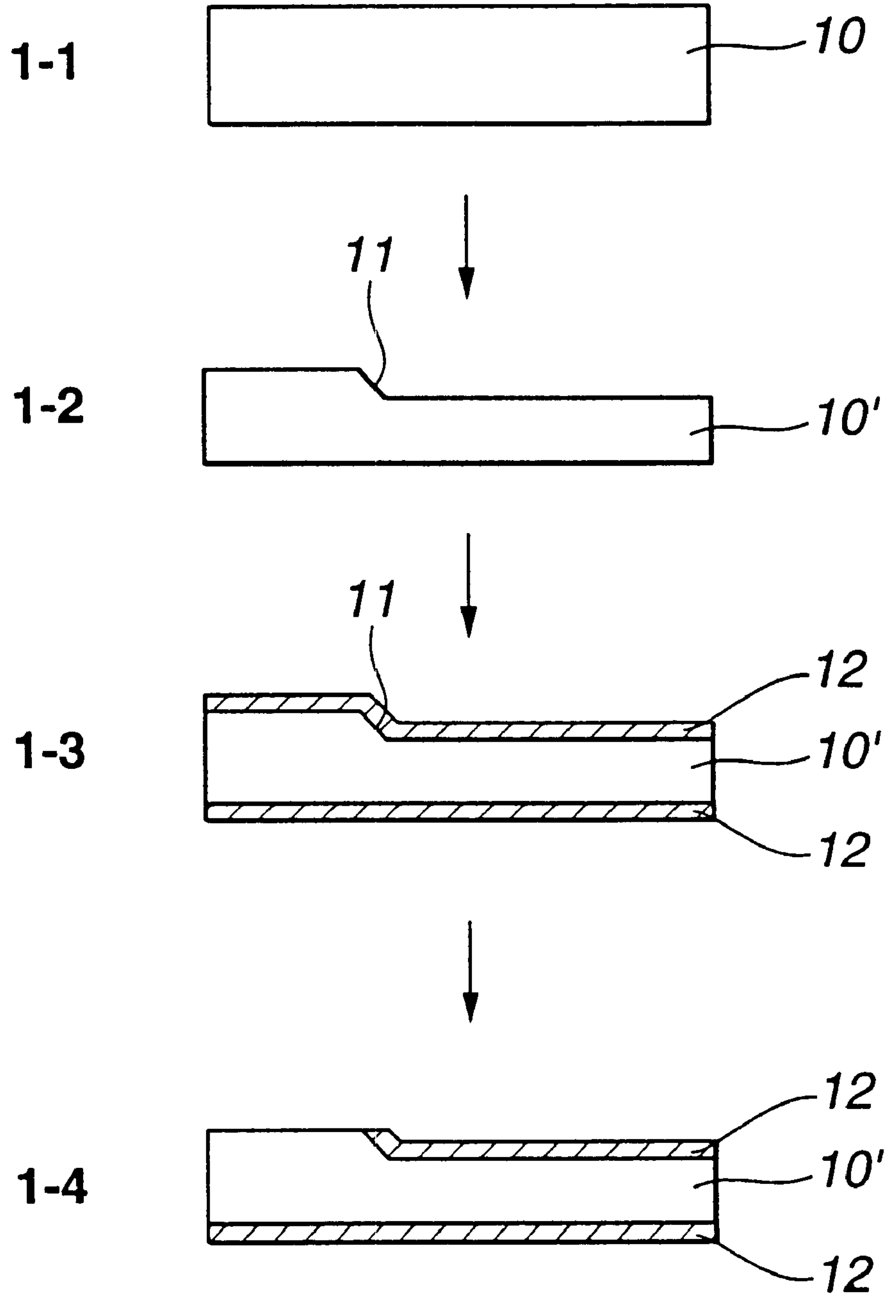
FIG. 1 illustrates a method for preparing an optical device silicon substrate by high pressure heat oxidation.
Figure 2:
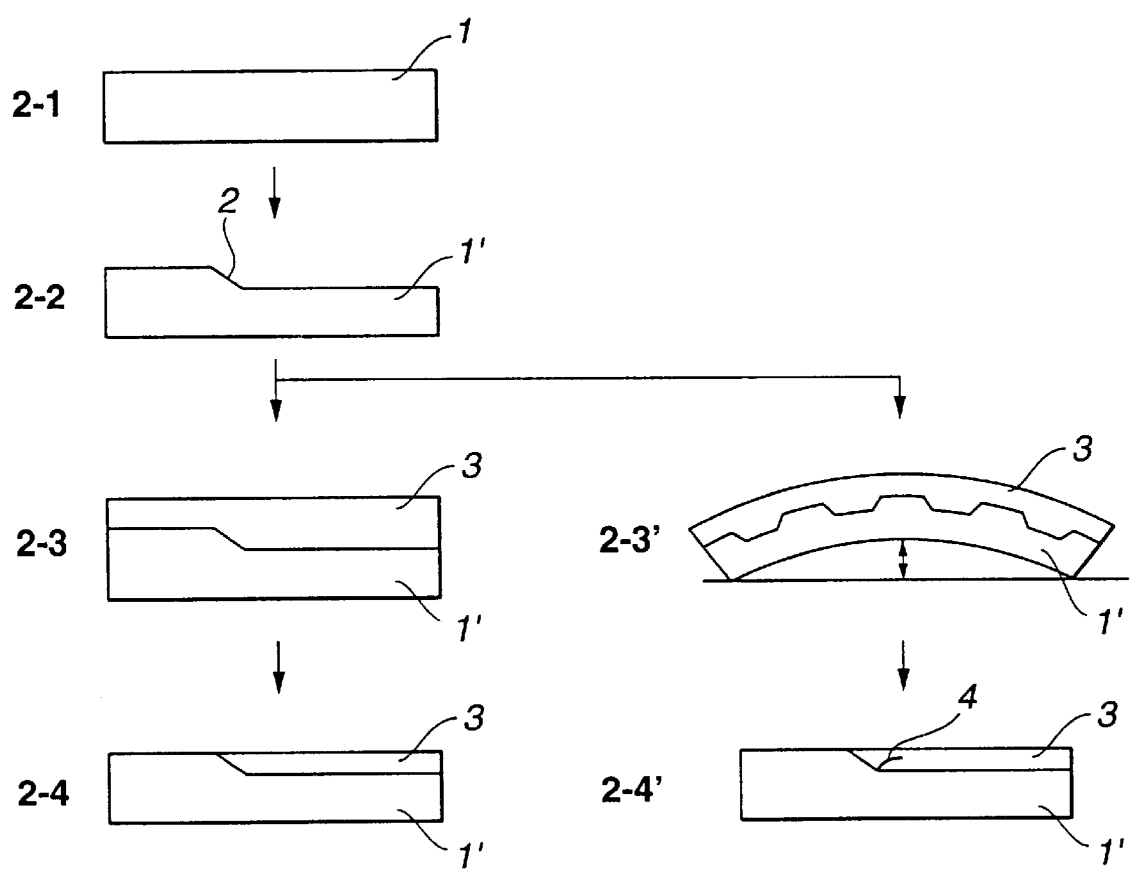
FIG. 2 illustrates a prior art method for preparing an optical device silicon substrate by flame deposition.

Referring to FIG. 1, the method is described in detail. First, as shown in FIGS. 1-1 and 1-2, a silicon substrate 10 is formed on one surface with a step 11 as by etching. The etching process is not critical and may be effected in a conventional manner. When a terrace substrate is to be produced, anisotropic etching is effected on one surface of the initial silicon substrate using an alkali solution such as a potassium hydroxide aqueous solution. The resulting silicon substrate 10' has higher and lower surface regions connected by a step 11 of at least 5 μm high, preferably 5 to 30 μm high, on the one side.

Figure 3:
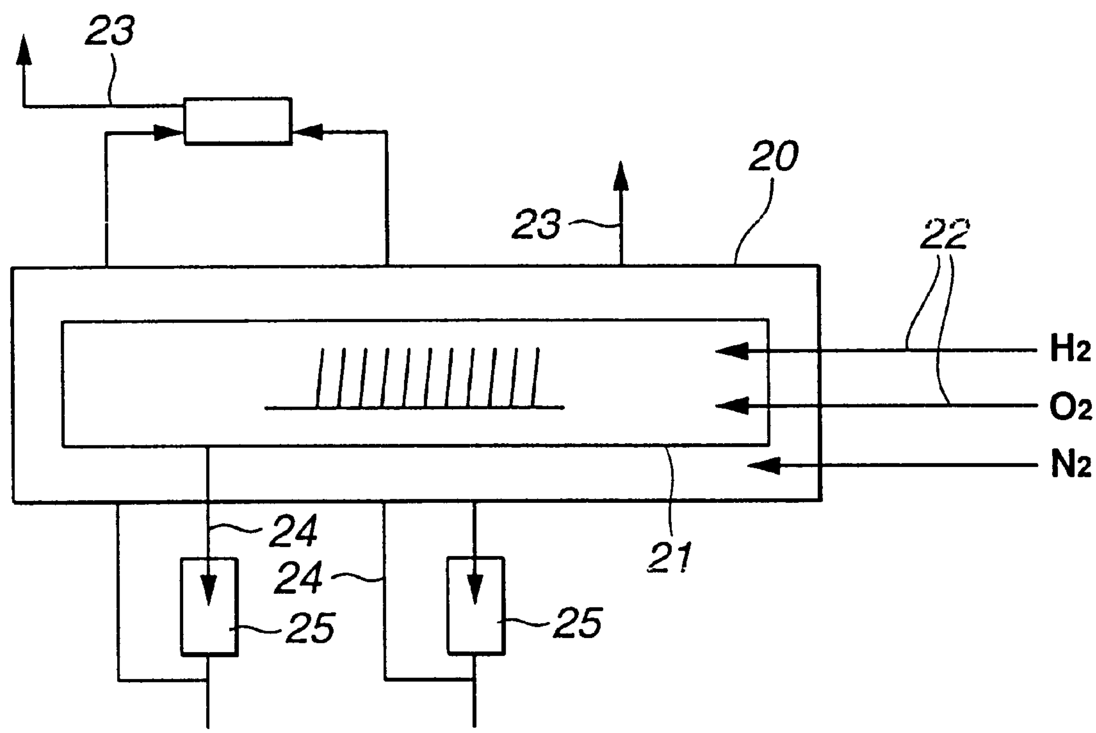
FIG. 3 is a schematic view of a high pressure heat oxidation apparatus used in the inventive method.

Next, the silicon substrate 10' having the step 11 on one side is subjected to high pressure heat oxidation whereby a quartz film 12 which is thinner than the height of the step 11 is formed on each side of the substrate as shown in FIG. 1-3. It is seen that on the upper side, the quartz film 12 is formed as a continuous film on both the higher and lower surface regions. It is noted that when a quartz film is formed on a surface-stepped silicon substrate by flame deposition, the resulting quartz film normally has a thickness greater than the step. In contrast, the high pressure heat oxidation process is to oxidize the substrate itself, that is, the oxide film is formed within the substrate.

In carrying out high pressure heat oxidation, an apparatus as shown in FIG. 3 may be used, for example. The apparatus of FIG. 3 includes a cylindrical high pressure container (Kanthal heater module) 20 and a quartz furnace core tube 21 disposed concentrically therein. Silicon substrates 10 are set perpendicular to the axis of the core tube 21. Within the core tube 21, thermal oxidation reaction is effected under a high pressure and at a high temperature. To the high pressure container 20 are coupled combustion gas feed lines 22, exhaust lines 23, and water drain lines 24 having traps 25.

The high pressure heat oxidation process is described in more detail. A heater (not shown) is operated to heat the interior of the quartz furnace core tube 21 to a temperature of 700° C. or higher. Silicon substrates each having a stepped surface are set within the core tube. Hydrogen and oxygen are introduced into the core tube at predetermined flow rates or in a predetermined flow ratio, thereby creating steam within the core tube. The substrates are oxidized with hot steam, that is, wet oxidation is effected. For accelerating high pressure heat oxidation reaction, it is advantageous to introduce steam into an oxidizing atmosphere (see VLSI Technology, second edition, page 10) and to increase the pressure of an oxidizing atmosphere (see VLSI Technology, second edition, page 121, and JP-A 52-154360).

To accelerate the rate of oxidation, the above apparatus is preferably equipped with means for pressurizing the interior of the quartz furnace core tube to a pressure higher than atmospheric pressure, typically 2 to 10 atm. It is noted that in order to form an oxide film of a desired thickness, high pressure heat oxidation may be carried out either continuously or intermittently while the oxidation time is preferably from about 50 to 400 hours.

At the end of high pressure heat oxidation, the silicon substrate warps to a distance of about 0.2 to 2 μm, which is extremely small as compared with the warpage of a similar substrate subjected to flame deposition.

Referring to FIG. 1 again, the oxide film 12 on the higher surface region of the oxidized substrate 10' (FIG. 13) is polished or etched away until the silicon surface in the higher surface region is exposed as shown in FIG. 1-4. Any conventional polishing or etching process may be employed herein. Since it is desirable to minimize the warpage of the substrate prior to polishing, the substrate is usually secured to a support with an adhesive so as to reduce the warpage within about ±0.2 μm. In this state, the oxide film on the higher surface region is polished away to define a flat surface. As polishing is further continued, the silicon substrate surface is exposed in the higher surface region and the oxide film in the lower surface region is left intact. Preferably the oxide film in the lower surface region or recess has a thickness of about 5 to 30 μm over the entire wafer as measured by the prism coupling method.

The high pressure heat oxidation process has a possibility that the oxide film have a concentration distribution of oxygen in a thickness direction thereof. When the concentration distribution of oxygen in cross section of the oxide film is actually measured by an Auger electron spectrometer (ULVAC Company), a distribution is found up to 1 μm from the interface with silicon, but the concentration is substantially constant above that level. This result is substantially equivalent to the oxygen concentration distribution of a quartz film formed by flame deposition. It is thus concluded that the oxygen concentration is substantially constant in a thickness direction.

The silicon substrate produced by the method of the invention is of quality in that it has excellent electrical properties, minimized warpage, a substantially constant oxygen concentration in a thickness direction of the oxide film, and a definitely ascertainable boundary between the oxide film and the silicon. It is thus suitable for use in optical waveguide devices in optical integrated circuits. The method of the invention is advantageous in the industry because a terrace structure of silicon substrate can be briefly produced through simple steps while preventing warpage of the substrate and micro-cracking of the oxide film.

EXAMPLE

Examples of the invention are given below by way of illustration and not by way of limitation.

Example

First, a silicon substrate having a diameter of 4 inches and a thickness of 1 mm was formed on one surface with a mask pattern of 2-mm square apertures at intervals of 10 mm. With a 20% aqueous solution of potassium hydroxide applied to the substrate surface while heating at 60° C., etching was effected for about 60 minutes. The surface areas within the apertures were etched to form recesses of 25 μm deep having (111) side walls.

The recessed substrate was oxidized by a high pressure heat oxidation process using the apparatus shown in FIG. 3. The high pressure heat oxidation apparatus of FIG. 3 had a Kanthal heater module 10 having a diameter of 250 mm and a length of 1,500 mm, and a quartz furnace core tube 11 having a diameter of 200 mm and a length of 1,000 mm disposed concentrically therein. The heater module 10 was divided into three equal sections so that an article could be heated uniformly within an error of ±1° C. The silicon substrate 12 having a diameter of 4 inches and a thickness of 1 mm was set perpendicular to the axis of the core tube 11. The recessed substrate was oxidized at 1,000° C. and 5 atm. for about 200 hours until an oxide film of 20 μm was formed on the substrate. The oxidized substrate had a warpage of 12 μm.

Prior to polishing, the oxidized substrate was secured to a glass plate with an adhesive so as to reduce the warpage of the substrate. In this state, the substrate had a warpage of 2 μm. By rotating a polisher with a load of 5 kg applied and using a colloidal silica suspension, the oxide film on the upper surface regions was polished to a depth of 25 μm. At this point, the substrate had a flat surface over its entirety. Polishing was continued to a further depth of 2 μm whereupon the silicon surface was exposed in the higher surface regions and the oxide film was left in the lower surface regions. At this point, the thickness and refractive index of the oxide film were measured by the prism coupling method. Over the entire wafer, the oxide film had a thickness of 16±2 μm and a refractive index of 1.4584±0.0001, indicating a substantially uniform thickness. The polishing time was as short as 40 minutes. At the end of polishing, the substrate had a warpage of 12.5 μm, which remained substantially unchanged from the warpage prior to polishing.

The boundary between the exposed silicon surface and the oxide film surface was observed definite as viewed under an interference microscope with a magnification of X50, suggesting no problems at the boundary. No micro-cracks were found near the boundary.

Comparative Example

As in Example, one surface of a silicon substrate was alkali etched to form recesses of 20 μm deep.

On the recessed substrate, a quartz film was deposited by the flame deposition process. The silicon substrate was rested on a table heated at 400° C. Flame hydrolysis was effected while flowing 0.45 sccm of $SiCl_4$, 0.20 sccm of $BBr_3$, 0.02 sccm of $POCl_3$, 8 liter/min of $H_2$ and 4 liter/min of $O_2$. In this way, a quartz film was deposited on the silicon substrate. Thereafter, the quartz film on the substrate was fired at 1,300 to 1,350° C. in an atmosphere of He and oxygen mixture, obtaining a transparent quartz film. The quartz film had a thickness of 30 μm which was greater than the step. The quartz film-bearing recessed substrate had a warpage of 210 μm.

Prior to polishing, the substrate was secured to a glass plate with an adhesive so as to reduce the warpage of the substrate. In this state, the substrate had a warpage of 20 μm which could be reduced no longer. Using a ceramic jig, the substrate on the back was chucked under a vacuum of 0.1 atm. At this point, the warpage of the substrate was reduced to 3 μm. By rotating a polisher with a load of 10 kg applied and using a colloidal silica suspension, the quartz film was polished to a depth of 10 μm. At this point, the substrate had a flat surface over its entirety. Polishing was continued to a further depth of 2 μm whereupon the silicon surface was exposed in the higher surface regions and the oxide film was left in the lower surface regions. At this point, the thickness and refractive index of the oxide film were measured by the prism coupling method. Over the entire wafer, the oxide film had a thickness of 16±3 μm and a refractive index of 1.4584±0.0002, indicating an inferior thickness uniformity to the high pressure oxidation process in Example. The polishing time was as long as 180 minutes for polishing over the entire wafer. At the end of polishing, the substrate had a warpage of 205 μm, which remained substantially unchanged from the warpage prior to polishing. The warpage was outstanding as compared with the high pressure oxidation process in Example.

The boundary between the exposed silicon surface and the oxide film surface was viewed under an interference microscope with a magnification of X50, finding over the entire wafer two micro-cracks of 500 μm long near the boundary.

Japanese Patent Application No. 11-213443 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing a silicon substrate, comprising the steps of:

furnishing a silicon substrate having higher and lower surface regions connected by a step of at least 5 μm high on the same side, subjecting the silicon substrate to high pressure heat oxidation to form thereon an oxide film which is thinner than the height of said step, and removing the oxide film on the higher surface region by polishing or etching, thereby exposing the silicon surface in the higher surface region while leaving the oxide film on the lower surface region.

* * * * *